Jan. 9, 1940.   F. V. BROWN   2,186,235
LIQUID PRESSURE REMOTE CONTROL SYSTEM
Filed Feb. 4, 1937   2 Sheets-Sheet 2

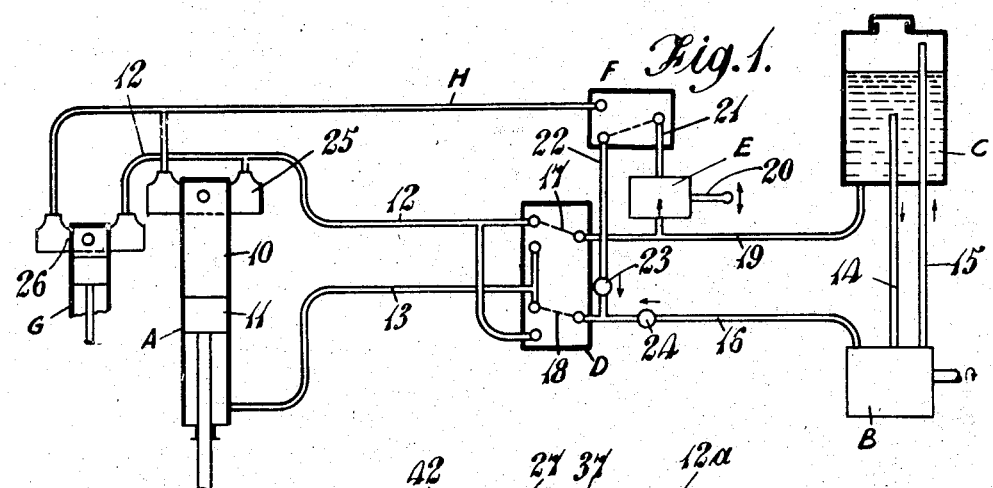

INVENTOR
F. V. Brown.
By Lacey & Lacey,
Attys.

Patented Jan. 9, 1940

2,186,235

UNITED STATES PATENT OFFICE 2,186,235

LIQUID PRESSURE REMOTE CONTROL SYSTEM

Francis Victor Brown, London, England, assignor to Automotive Products Company Limited, London, England, a British company Application February 4, 1937, Serial No. 124,154
In Great Britain February 5, 1936

2 Claims. (Cl. 60—52)

This invention relates to liquid pressure remote control systems, and it has for its object to provide an improved method and means for use especially in applications where it is desirable that a choice of pipe lines should be available, such for example as on military aircraft where there is always a danger of one or more of the component parts of the system becoming inoperative. The pipe lines of a remote control system are perhaps most liable to this danger as they extend usually for long distances, and are rendered inoperative by a rupture at any point in their length.

Regarded broadly therefore the invention provides in a liquid pressure remote control system comprising a pressure producing pump and a fluid motor connected together by one or more pipe lines, an auxiliary pipe line which from a position adjacent the pump can be brought into operation in place of the pipe line or one of the pipe lines normally used, the line thus replaced being isolated from the auxiliary pipe line. Thus, the invention provides an arrangement in which the auxiliary pipe line connects one side of the motor with a source of liquid pressure whereby the motor can be actuated in one particular direction in the event of both of the normal pipe lines being destroyed. The invention is consequently useful in conjunction with aircraft retractable undercarriages, the lowering of which is effected completely or is assisted by liquid pressure generated or controlled by a pump.

As a further feature the invention provides a liquid pressure remote control system incorporating an auxiliary pipe line to be brought into use in the case of emergency, which auxiliary pipe line extends from a source of pressure liquid to a motor and feeds the latter through an automatic valve arranged to prevent the pressure liquid fed through the auxiliary pipe line from escaping through the normal pipe line serving to actuate the motor in the same direction as liquid fed through the auxiliary pipe line. Preferably, the motor is double-acting and is normally operated through a pair of pipe lines, an auxiliary pipe line extending from a source of pressure to one side of the motor being fitted at that end adjacent the pump with a manually actuated valve for connecting said pipe with the said source of pressure, and at its other end with an automatic pressure-operated valve arranged, when the auxiliary pipe line is fed with liquid under pressure, to disconnect one of the main pipe lines from the motor and connect the auxiliary pipe line in its place. For controlling the auxiliary pipe line the pump may be connected with a manually actuated two-way valve, the branches of which feed one of the normal pipe lines and the auxiliary pipe line respectively. Moreover, the preferred construction of automatic valve comprises a piston which is displaced by pressure liquid fed through the auxiliary pipe line, and which thus automatically changes over the connection of the motor from the normal pipe line to the auxiliary pipe line.

The invention further provides a remote control system comprising in combination a reversible flow pump, a double-acting motor, a pair of normal pipe lines connecting the pump with the motor, a two-way manually actuated valve interposed in one of the pipe lines adjacent the pump, a pressure-controlled valve interposed in one of the pipe lines where it joins the motor and an auxiliary pipe line connected between the two-way valve and the pressure-controlled valve. If desired, a reversing valve device may be interposed in the two normal pipe lines so as to determine in which direction the motor is normally actuated, while in a modification two pumps are arranged to feed normally two motors through two pairs of pipe lines, and the auxiliary pipe line is connected between one of the pumps and the motor normally fed from the other pump. The improved system is conveniently replenished with liquid from a reservoir, which latter has a plurality of outlet pipe lines disposed at different levels so that breakage of a pipe line fed from an outlet at a relatively high level can only partly empty the reservoir, the auxiliary pipe line being fed from an outlet at the bottom of the reservoir. Moreover, the system can comprise a mechanically actuated pump normally serving to work the motor and a manually-actuated pump which is provided primarily for emergency operation, and is arranged to pass pressure liquid into the two-way valve for delivery to the motor through either the normal pipe line or the auxiliary pipe line.

Examples of the improved liquid pressure control system are given in the accompanying drawings in which Figure 1 is a diagram showing the connections of the preferred system;

Figure 2 is a transverse section taken through the automatic pressure controlled valve, the parts being shown in the positions they occupy during normal operation;

Figure 3 is a similar view showing the position of the parts when pressure liquid is introduced through the auxiliary pipe line;

Figure 4:
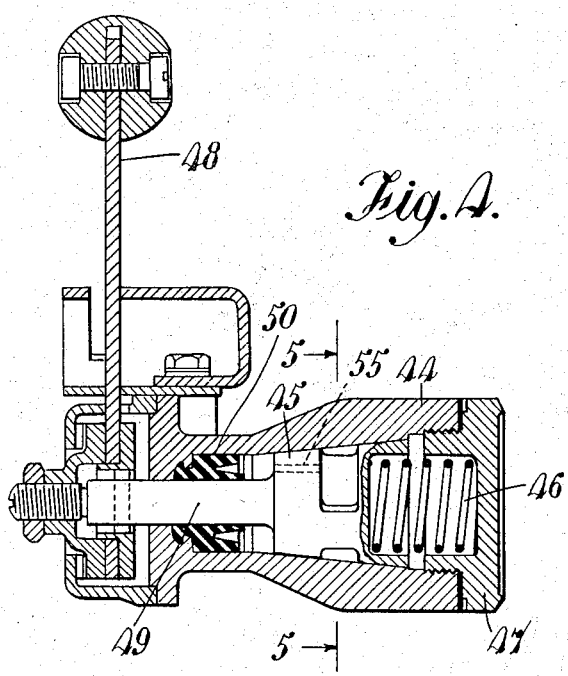
Figure 4 is a sectional side elevation through one construction of two-way valve.

In the system shown in Figures 1 to 5, a double-acting motor A comprising a cylinder 10 containing a slidably mounted piston 11 is fed normally through a pair of pipe lines 12 and 13, either one of which is supplied with liquid under pressure by means of a mechanically driven pump B which is fed with liquid from a reservoir C through a pipe 14. The pump B, the internal details of which form no part of the present invention, is provided with an automatic valve (not shown), whereby the delivery when the remote control system is not being used is conducted through a pipe 15 and returns to the reservoir C. For determining the direction in which the motor A is actuated during normal use a reversing valve, which may be of any convenient construction, is indicated at D, in Figure 1, and is arranged so that the delivery from the mechanically driven pump B passing through a pipe 16 can be transferred, either to the pipe line 13 for raising the piston 11, or to the pipe line 12 for lowering said piston. As shown, the valve D comprises a pair of two-way valve elements 17 and 18 which are operated simultaneously to produce the necessary reversing action. It will be seen that whichever way the piston 11 is actuated, the liquid rejected from the cylinder 10 passes through a pipe 19 and is returned to the reservoir C.

A hand pump or other manually-operated pressure-creating device serving as a pump is indicated at E, and is primarily intended for operation when the pump B is not working or when the system is partly disabled, as will be hereafter described. The pump E is fed through the pipe 19, and when the handle 20 is oscillated the liquid is forced through a pipe 21 into a two-way valve F. In the normal position of the latter as indicated by the broken lines in Figure 1, the liquid then passes along a pipe 22 and joins the pipe 16 from which it can be fed to either side of the cylinder 10. A non-return valve 23 in the pipe 22 and a similar fitting 24 in the pipe 16 prevent the liquid from the pump B entering the pump E and vice versa.

In the installation shown in Figure 1 it is assumed that the piston 11 is used for controlling the movements of an aircraft undercarriage, and that the downward movement of said piston brings about or at least assists the lowering of the undercarriage. Moreover, a subsidiary motor G which can be of the single-acting type is also connected with the pipe line 12 so as automatically to release the usual retaining latch (not shown) of the undercarriage. It will be evident, therefore, that if the undercarriage is raised and the pipe 12 is fractured difficulty might normally be experienced in releasing the undercarriage for landing purposes, but this difficulty is overcome in accordance with the present invention by the provision of an auxiliary pipe line H which is connected with the second branch of the two-way valve F, and which is connected through an automatic valve fitting 25 with the upper part of the cylinder 10 and also with the motor G through the medium of an automatic valve 26 of identical construction. It will be noted that the valves 25 and 26 also form the connections for the pipe line 12.

The construction of these valves is shown in Figures 2 and 3, and each comprises a body 27 having a cylindrical bore 28 connected at its centre part by a passage 29 leading into the working space 30 of the motor. At the right hand side of the body a screw-threaded connection 12a for the pipe 12 communicates through a series of apertures 31 with the axial passage 32 of a relatively sharp annular valve seating 33. At the left hand side the construction is similar except that an extended cap 34 serves for the accommodation of a coiled spring 35 surrounding and acting upon the stem 36 of a valve piston 37, the stem 36 being provided at its outer end with a collar 38 so that the spring 35 normally pulls the piston 37 against an annular valve seating 39. In order to make a sound joint a soft rubber washer 40 is provided upon the back of the piston 37, while a rubber disc 41 is arranged to engage with the seating 33 when the piston 37 moves to the right.

During normal operation of the system the piston 37 occupies the position shown in Figure 2, and pressure liquid forced through the pipe 12 freely enters the cylinder 28 and passes into the working space 30. Alternatively, liquid rejected by the space 30 during the upward movement of the piston 11 freely passes out through the pipe 12. In the event of the pipe 12 becoming fractured, however, the two-way valve F is moved so that liquid from the hand pump E passes along the auxiliary pipe line H which leads to a screw connection 42, thus causing the liquid to pass through a passage 43 in the body 27 and force the piston 37 to the position shown in Figure 3 where it closes the seating 33, thus blocking off the pipe line 12 and at the same time permits the liquid from the auxiliary pipe line H to enter the upper part of the motor A. A similar action takes place within the automatic valve 26, so that this is simultaneously fed with liquid from the auxiliary pipe line H.

The reservoir C shown in Figure 1 is arranged so that the inlet pipe 14 for the mechanically driven pump B has its intake aperture disposed relatively high within the reservoir, so that in the event of a fracture taking place in any of the pipe lines fed by this pump the liquid level in the reservoir cannot fall below the top of the pipe 14. This automatically leaves a reservoir which can be utilized by the hand pump E for lowering the undercarriage, as it will be seen that the pipe 19 receives its liquid from the bottom of the reservoir when the hand pump is in operation.

Figure 5:
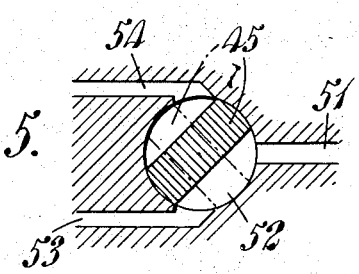
Figure 5 is a fragmentary section taken on the line 5—5 of Figure 4 to illustrate the action of the valve.

The preferred construction of two-way valve F is shown in Figures 4 and 5, and comprises a body 44 having the three necessary pipe connections, the interior of said body being bored to a taper for the accommodation of a plug 45. This is maintained in engagement with the bore by means of a spring 46 secured by a cover 47 and is manipulated by a lever handle 48 engaging a spigot 49. At opposite sides the plug 45 is cut away to form passages for the liquid as will be seen in Figure 5, so that in the normal position of the plug shown in full lines the liquid enters through a passage 51 and, passing through the cut away part 52, enters a delivery passage 53 leading to the pipe 22. When the plug 45 is moved through a right angle it similarly establishes communication between the passage 51 and the second delivery passage 54 leading to the auxiliary pipe line H. A rubber packing cup 50 surrounds the spigot 49 to prevent leakage, and is placed in communication with the working liquid by a pair of passages, one of which is indicated at 55; both of said passages 55 being so located, however, that they are out of communication with the delivery passage 54 in the position of the valve as shown in full lines in Fig. 5, and are correspondingly out of communication with the pasage 53 in the position of the valve indicated in dash lines in said figure.

Figure 6:
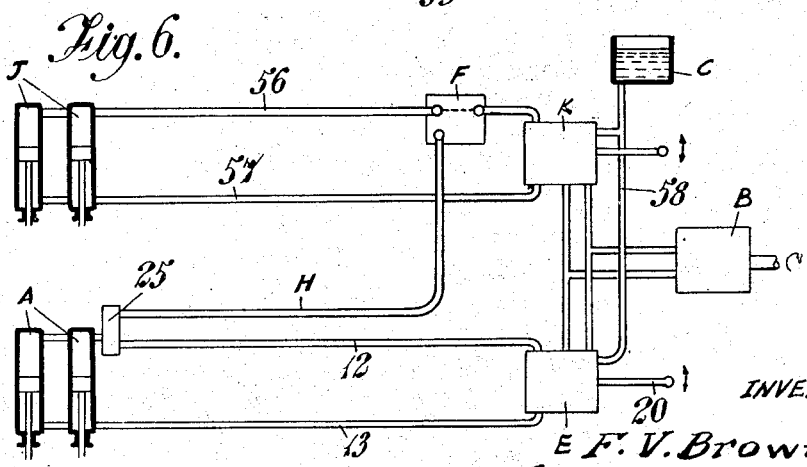
Figure 6 is a diagram showing a modified system applicable where two separate pumps are available for emergency use.

In the modified form of system shown in Figure 6 two motors A connected in parallel for simultaneous operation are arranged for controlling the movements of an aircraft undercarriage, and are normally actuated by pressure liquid transmitted through a pair of pipe lines 12 and 13, an automatic valve 25 being interposed as before. For feeding the system a hand pump E and a mechanically driven pump B are arranged for alternative actuation, as for example is described in British Patent Specification No. 448,478, the output from the pump B being controlled by the handle 20 of the pump E. A substantially similar system comprises a pair of motors J used say for actuating the flaps of an aircraft, these units also being double-acting and being supplied with pressure liquid through pipe lines 56 and 57 by means of a hand pump K also arranged to receive pressure liquid from the mechanically driven pump B. Adjacent the pump K a two-way valve F is interposed in the pipe line 56, and is connected with the automatic valve 25 by means of an auxiliary pipe line H. A reservoir C maintains the casings of the hand pumps K and E full of liquid through a pipe line system 58. During normal operation the two-way valve F is set in the position shown in Figure 6, and the two hand pumps K and E operate their motors J and A respectively. Should, however, the pipe line 12 become damaged when the undercarriage is retracted or should the pump E fail to operate, the undercarriage can be lowered by working the hand pump K, the two-way valve F of course being changed over so that the liquid is delivered through the auxiliary pipe line H. It will be understood that where a plurality of motors are operated in parallel, as in the example shown in Figure 6, a single automatic valve 25 may feed all of the motors, or alternatively one such valve may be provided for each motor. Further, in this specification and claims where the term "motor" is employed it is understood to include also a number of motors adapted to work in unison.

It will, of course, be understood that the invention is not limited to the examples described and that the principles of using an auxiliary pipe line may be used in remote control apparatus other than that associated with aircraft. Moreover, the construction of the automatic valves enabling the auxiliary pipe line or lines to be brought into action may be varied to suit requirements, and any suitable forms of supply tank or a plurality of supply tanks can be utilized for feeding the system in such a manner that the liquid supply is maintained as long as possible despite the disablement of some of the apparatus.

What I claim is:

1. Fluid pressure remote control system comprising, in combination, a fluid pressure responsive motor, a source of fluid pressure for supplying operating fluid to said motor, a main supply line connecting the source of fluid pressure to the motor, an auxiliary line extending from the motor to the source of fluid pressure, a manually operated valve for connecting the auxiliary line with said source of pressure, and automatically acting means for disconnecting the motor from the main supply line in response to operation of said valve, said means being so operable only in the event that said main supply line has theretofore been disconnected from said source of fluid pressure.

2. An aircraft undercarriage control system comprising, in combination, a double-acting fluid pressure responsive motor, a source of fluid pressure for supplying operating fluid to said motor, a main supply line connecting the source of fluid pressure to the motor for the transmission to the latter of operating fluid for operating the motor during both retraction and extension of the undercarriage, an auxiliary line extending from the motor to the source of fluid pressure and adapted to receive operating fluid for operating the motor in one direction, a manually operated valve for connecting the auxiliary line with said source of pressure, and automatically acting means for disconnecting the motor from the main supply line in response to operation of said valve, said means being so operable only in the event that said main supply line has theretofore been disconnected from said source of fluid pressure.

FRANCIS VICTOR BROWN.